(12) United States Patent
Liu

(10) Patent No.: US 11,079,297 B2
(45) Date of Patent: Aug. 3, 2021

(54) INTEGRATED FORCE SENSOR

(71) Applicants: Chang Liu, Foshan (CN); Foshan Sensicfusion Technology Co., LTD, Foshan (CN)

(72) Inventor: Chang Liu, Foshan (CN)

(73) Assignee: Foshan Sensicfusion Technology Co., Ltd, Foshan (CN)

( * ) Notice: Subject to any disclaimer, the term of this patent is extended or adjusted under 35 U.S.C. 154(b) by 598 days.

(21) Appl. No.: 16/068,414

(22) PCT Filed: Dec. 4, 2017

(86) PCT No.: PCT/CN2017/114420
§ 371 (c)(1),
(2) Date: Jul. 6, 2018

(87) PCT Pub. No.: WO2019/109204
PCT Pub. Date: Jun. 13, 2019

(65) Prior Publication Data
US 2021/0164855 A1  Jun. 3, 2021

(51) Int. Cl.
*G01L 19/06* (2006.01)
*G01L 19/00* (2006.01)

(52) U.S. Cl.
CPC ...... *G01L 19/0618* (2013.01); *G01L 19/0007* (2013.01)

(58) Field of Classification Search
None
See application file for complete search history.

(56) References Cited

U.S. PATENT DOCUMENTS 6,561,036 B1 * 5/2003 Gustafsson ........... G01L 23/145
73/714

FOREIGN PATENT DOCUMENTS

CN           202994340      *  6/2013

* cited by examiner

*Primary Examiner* — Lisa M Caputo
*Assistant Examiner* — Nigel H Plumb
(74) *Attorney, Agent, or Firm* — Bay State IP, LLC

(57) ABSTRACT

The present invention discloses an integrated force sensor, characterized in comprising: a substrate, flexible through-cavities formed on the substrate, and a flexible skin covering the flexible through-cavities, wherein a lug boss is formed on the substrate; the flexible through-cavities are divided into two segments under the action of the lug boss, one end of the flexible through-cavities is connected with a pressure sensor used to measure the internal pressure of the flexible through-cavities, and the other end of the flexible through-cavities is communicated with outside air. In the invention, the force to be measured changes the gas pressure by changing the shape of an object and detects the magnitude of the force to be measured by detecting the gas pressure. Besides, the overloaded pressure can be released through the pressure release mechanism, without affecting the safety of the film of the pressure sensor or resulting in permanent damage to film.

7 Claims, 2 Drawing Sheets

INTEGRATED FORCE SENSOR

CROSS REFERENCE TO RELATED APPLICATION

This application is for entry into the U.S. National Phase under § 371 for International Application No. PCT/CN2017/114420 having an international filing date of Dec. 4, 2017, and from which priority is claimed under all applicable sections of Title 35 of the United States Code including, but not limited to, Sections 120, 363, and 365(c).

TECHNICAL FIELD

The invention relates to the field of sensor technology, in particular to an integrated force sensor.

BACKGROUND ART

The existing force sensor measures the force magnitude by a piezoresistive sensitive element (metal or silicon doping device). The measurement principle is that: A force exerted on a silicon film can cause stress concentration, resulting in a resistance change of the piezoresistive sensitive element, and the resistance change can be transformed into a voltage change through a Wheatstone bridge. Such products are characterized by high sensitivity. However, a fatal problem exists: since the force is always exerted directly on the surface of the silicon film of the pressure sensor, when overloaded pressure is applied to the silicon film, the film can easily have an irreversible damage, and the damage mechanism includes plastic deformation (such as metal), fracture, etc. Thus, the operational overload for the conventional force sensors should not exceed 150% in general.

SUMMARY OF THE INVENTION

The purpose of the invention is to provide a high sensitivity and high explosion-resistance force sensor, without damage to the film even if overloaded by 100 times.

For the above purpose, the invention adopts the technical scheme as follows.

An integrated force sensor, characterized in comprising a substrate, flexible through-cavities formed on the substrate, and a flexible skin covering the flexible through-cavities, wherein a lug boss is formed on the substrate; the flexible through-cavities are divided into two segments under the action of the lug boss, one end of the flexible through-cavities is connected with a pressure sensor used to measure the internal pressure of the flexible through-cavities, and the other end of the flexible through-cavities is communicated with outside air.

As a further explanation of the above scheme, the flexible through-cavities are in a tubular structure.

As a further explanation of the above scheme, the flexible through-cavities are formed in the middle of the substrate, the lug boss is a strip-shaped lug boss, and the trend of the strip-shaped lug boss is perpendicular to that of the tubular flexible through-cavities.

As a further explanation of the above scheme, the lug boss is integrally moulded on the substrate.

As a further explanation of the above scheme, the flexible through-cavities are formed into a plurality of mutually communicated flexible through-cavities parallel to each other.

As a further explanation of the above scheme, if the pressure applied to the flexible skin does not exceed the maximum measured value of the pressure sensor, the flexible through-cavities are still divided into two segments under the action of the lug boss, the position of the flexible through-cavities corresponding to the lug boss is still closed, and at this time, the amount of force is sensed by measuring the gas pressure in the flexible through-cavities; if the pressure applied to the flexible skin exceeds the maximum measured value of the pressure sensor, the position of the flexible through-cavities corresponding to the lug boss is forced open to make the gas escape and avoid damage to the pressure sensor by significant pressure changes.

As a further explanation of the above scheme, the maximum measured value of the pressure sensor needs to be measured by experiment before use; when the measured value of the pressure sensor is greater than or equal to the maximum value, the measurement is inaccurate, and the maximum value is accurate and valid only when the measured value of the pressure sensor is less than the maximum value.

The invention has the advantages that:

The force to be measured changes the gas pressure by changing the shape of an object and detects the magnitude of the force to be measured by detecting the gas pressure. Besides, the overloaded pressure can be released through a pressure release mechanism, without affecting the safety of the film of the pressure sensor or resulting in permanent damages to the film even if it exceeds static pressure overload by 100 times.

DESCRIPTION OF DRAWING MARKINGS

1: Substrate, 2: Flexible through-cavities, 3: Flexible skin, 4: Pressure sensor, 5: Lug boss.

DETAILED DESCRIPTION OF THE PREFERRED EMBODIMENTS

Unless otherwise specified and defined, the terms "assembly", "connected" and "connection" herein shall be understood in a broad sense, such as fixed connection, detachable connection, or integrated connection; mechanical connection; directly connected, or connected by an intermediate media, or communication inside two elements. For one of ordinary skill in the art, the specific meanings of the above terms herein can be understood as the case may be.

Unless otherwise specified and defined in the invention, a first feature "over" or "below" a second feature may include either direct contact between the first feature and the second feature or contact between the first feature and the second feature through an additional feature between them instead of direct contact. Moreover, the fact that the first feature is "over", "below" and "on" the second feature comprises the fact that the first feature is right above and above the second feature, or only represents the fact that the horizontal height of the first feature is higher than the height of the second feature. The fact that the first feature is "over", "below" and "under" the second feature comprises the fact that the first feature is right below or below the second feature, or only represents the fact that the horizontal height of the first feature is lower than that of the second feature.

The technical scheme and advantages thereof are made clearer and more explicit below by further description of the embodiments combined with the drawings of description. It will be described by reference to the drawings below that the embodiments are illustrative, which is intended to explain the invention, and shall not be interpreted as a limitation to the integrated force sensor.

Figure 1:
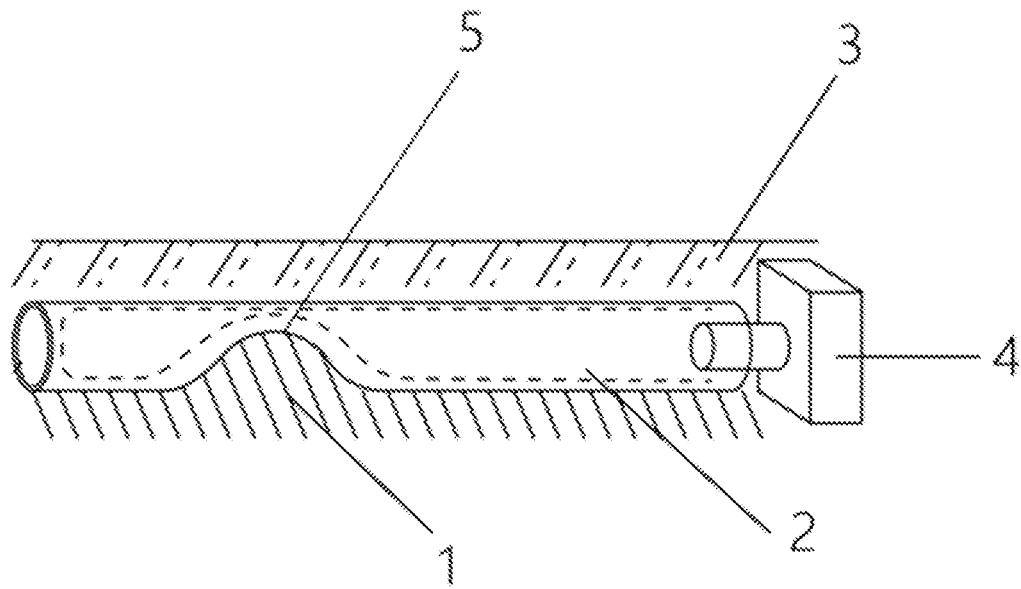
FIG. 1 illustrates a structural diagram of the integrated force sensor provided by the invention.

As shown in FIG. 1, an integrated force sensor, comprising a substrate 1, flexible through-cavities 2 formed on the substrate 1, and a flexible skin 3 covering the flexible through-cavities 2, wherein a lug boss 5 is formed on the substrate 1; the flexible through-cavities 2 are divided into two segments under the action of the lug boss 5, one end of the flexible through-cavities 2 is connected with a pressure sensor 4 used to measure the internal pressure of the flexible through-cavities 2, and the other end of the flexible through-cavities 2 is communicated with outside air.

In this embodiment, the preferred flexible through-cavities 2 form a tubular structure arranged in the middle of the substrate 1, and the preferred lug boss 5 is a strip-shaped lug boss integrally moulded on the substrate 1. The trend of the strip-shaped lug boss is perpendicular to that of the tubular flexible through-cavities.

In other embodiments, the tubular flexible through-cavities can also be formed into a plurality of mutually communicated flexible through-cavities parallel to each other depending on the shape and size of the substrate; it is not limited to this embodiment.

Figure 2:
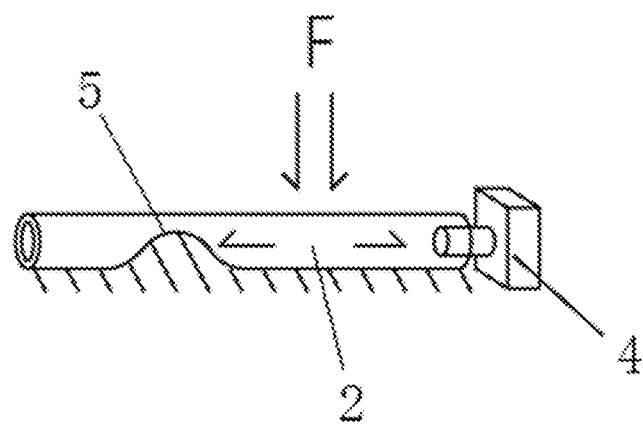
FIG. 2 illustrates a diagram of normal force detection state of the integrated force sensor provided by the invention.
Figure 3:
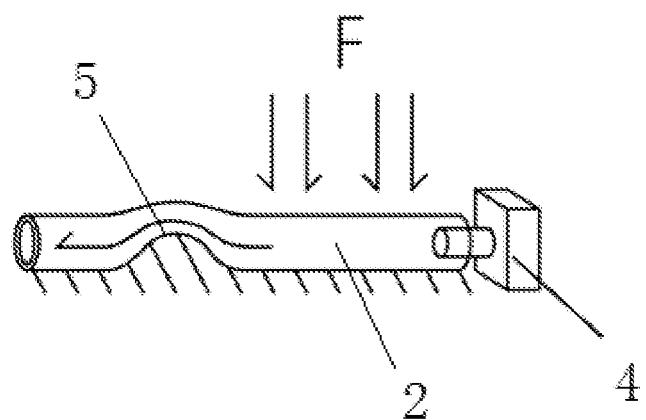
FIG. 3 illustrates a diagram of overload detection state of the integrated force sensor provided by the invention.

In actual work, 1) if the pressure F applied to the flexible skin does not exceed the maximum measured value of the pressure sensor 4, the flexible through-cavities 2 are still divided into two segments under the action of the lug boss 5, the position of the flexible through-cavities 2 corresponding to the lug boss 5 is still closed, and at this time, the amount of force is sensed by measuring the gas pressure in the flexible through-cavities 2; as shown in FIG. 2. 2) if the pressure F applied to the flexible skin exceeds the maximum measured value of the pressure sensor 4, the position of the flexible through-cavities 2 corresponding to the lug boss 5 is forced open to make the gas escape and avoid damage to the pressure sensor 4 by significant pressure changes; as shown in FIG. 3.

The maximum measured value of the pressure sensor 4, which varies with the material and size of the flexible through-cavities, needs to be measured by conventional experiment before use. When the measured value of the pressure sensor is greater than or equal to the maximum value, the measurement is inaccurate, and the maximum value is accurate and valid only when the measured value of the pressure sensor is less than the maximum value to ensure the accuracy of the measurement.

Through the description of the above structure and principle, persons skilled in the art shall understand that the invention is not limited to the above embodiments, and all the used improvements and substitutes of the well-known art in this field based on the invention are covered by the scope of protection of the invention which shall be defined by all claims and equivalents thereof.

What is claimed is:

1. An integrated force sensor, characterized in comprising a substrate, flexible through-cavities formed on the substrate, and a flexible skin covering the flexible through-cavities, wherein a lug boss is formed on the substrate; the flexible through-cavities are divided into two segments under the action of the lug boss, one end of the flexible through-cavities is connected with a pressure sensor used to measure the internal pressure of the flexible through-cavities, and the other end of the flexible through-cavities is communicated with outside air.

2. The integrated force sensor according to claim 1, characterized in that the flexible through-cavities are in a tubular structure.

3. The integrated force sensor according to claim 1, characterized in that the flexible through-cavities are formed in the middle of the substrate, the lug boss is a strip-shaped lug boss, and the trend of the strip-shaped lug boss is perpendicular to that of the tubular flexible through-cavities.

4. The integrated force sensor according to claim 1, characterized in that the lug boss is integrally moulded on the substrate.

5. The integrated force sensor according to claim 1, characterized in that the flexible through-cavities are formed into a plurality of mutually communicated flexible through-cavities parallel to each other.

6. The integrated force sensor according to claim 1, characterized in that if the pressure applied to the flexible skin does not exceed the maximum measured value of the pressure sensor, the flexible through-cavities are still divided into two segments under the action of the lug boss, the position of the flexible through-cavities corresponding to the lug boss is still closed, and at this time, the amount of force is sensed by measuring the gas pressure in the flexible through-cavities; if the pressure applied to the flexible skin exceeds the maximum measured value of the pressure sensor, the position of the flexible through-cavities corresponding to the lug boss is forced open to make the gas escape and avoid damage to the pressure sensor by significant pressure changes.

7. The integrated force sensor according to claim 6, characterized in that the maximum measured value of the pressure sensor needs to be measured by experiment before use; when the measured value of the pressure sensor is greater than or equal to the maximum value, the measurement is inaccurate, and the maximum value is accurate and valid only when the measured value of the pressure sensor is less than the maximum value.

\* \* \* \* \*